United States Patent
Botts

[11] 3,726,948
[45] Apr. 10, 1973

[54] PHOSPHONAMIDOTHIOATES
[75] Inventor: Marion F. Botts, Independence, Mo.
[73] Assignee: Chemagro Corporation, Kansas City, Mo.
[22] Filed: May 28, 1970
[21] Appl. No.: 41,650

[52] U.S. Cl. .......................... 260/944, 71/87, 71/88, 260/347.2, 260/984
[51] Int. Cl. .............................. A01n 9/36, C07f 9/44
[58] Field of Search ........................................ 260/944

[56] References Cited

UNITED STATES PATENTS 2,596,660   5/1952   Dickey ................................. 260/944
3,352,948   11/1967  Kawahara ............................ 260/944

Primary Examiner—Lewis Gotts
Assistant Examiner—Richard L. Raymond
Attorney—Burgess, Dinklage & Sprung

[57] ABSTRACT

Compounds of the formula

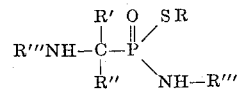

in which
R is alkyl of one to seven carbon atoms or cyclohexyl,
R' and R" each individually is alkyl of one to six carbon atoms, phenyl, 2-thienyl, p-tolyl or R' and R" taken together with the adjacent carbon atom form a cyclopentyl group, and
each R''' is the same or a different alkyl or alkenyl of one to seven carbon atoms, arylalkyl, cycloalkyl having five or six ring carbon atoms, furfuryl, tetrahydrofurfuryl, alkylthioalkyl or alkoxyalkyl, which are useful as herbicides and growth regulants, and process for their preparation.

7 Claims, No Drawings

PHOSPHONAMIDOTHIOATES

The present invention relates to and has for its objects the provision of particular new S-alkyl-α-alkyl-(or aryl)-α-alkylamino (or substituted alkylamino or cyclopentylamino or allylamino) alkylphosphonamidothioates which posses valuable herbicidal and/or growth regulant properties, active compositions in the form of mixtures of such compounds with solid and liquid dispersible carrier vehicles, and methods for producing such compounds and for using such compounds in a new way especially for combating weeds, undesired plants, and the like, and regulating plant growth in a desirable way, with other and further objects becoming apparent from a study of the within specification and accompanying examples.

It is known that S-alkyl-α-alkyl (or aryl) α-halo alkylphosphonochloridothioates, such as the compound of the formula

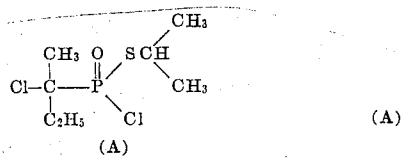

(A)

can be used as herbicidally active compounds (cf. U.S. Pat. No. 3,346,669).

It has now been found, in accordance with the present invention, that the particular new phosphonamidothioates of the general formula

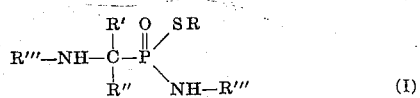

(I)

in which
R is alkyl of one to seven carbon atoms or cyclohexyl,
R' and R'' each individually is alkyl of one to six carbon atoms, phenyl, 2-thienyl, p-tolyl or R' and R'' taken together with the adjacent carbon atom form a cyclopentyl group, and
each R''' is the same or a different alkyl or alkenyl of one to seven carbon atoms, arylalkyl, cycloalkyl having five or six ring carbon atoms, furfuryl, tetrahydrofurfuryl, alkylthioalkyl or alkoxyalkyl,
exhibit strong herbicidal and/or growth regulant activity.

It has been furthermore found, in accordance with the present invention, that the compounds of formula (I) above may be produced by a process which comprises reacting an S-alkyl-α-chloro-α-alkyl (or aryl) alkane phosphono-chloridothioate of the formula

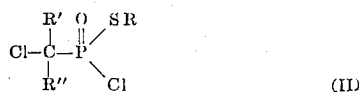

(II)

in which
R, R' and R'' are the same as defined above, with an amine of the formula $$H_2N—R'''$$ (III)

in which R''' is the same as defined above, optionally in the presence of a solvent.

Surprisingly, the alkylphosphonamidothioates of the instant invention having no halogen substituents show a higher herbicidal activity than the phosphonochloridothioates known from the prior art which are chemically the closest active compounds of the same type of activity. The active compounds of the present invention therefore represent a valuable enrichment of the art.

In accordance with a specific embodiment of the present invention, if S-isopropyl-α-chloro-α-methyl propylphosphonochloridothioate and isopropylamine are used as starting materials, the course of the reaction can be represented by the following reaction scheme:

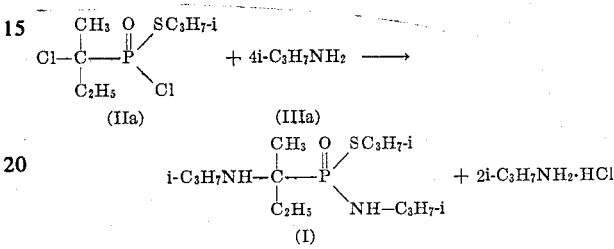

Advantageously, in accordance with the present invention, in the various formulas herein:

R represents cyclohexyl and lower alkyl of one to seven carbon atoms, including straight and branched chains, such as methyl, ethyl, n- and iso-propyl, n-, iso-, sec-, and tert.-butyl, and the like; and R' and R' each individually represents alkyl of one to six carbon atoms including straight and branched chains, such as methyl to isohexyl, especially $C_{1-2}$ alkyl, i.e., methyl and ethyl, or p-tolyl, phenyl or 2-thienyl or R' and R'' taken together with the adjacent carbon atoms form a cyclopentyl group; and R''' is the same or a different alkyl of one to seven carbon atoms, including straight and branched chains, such as methyl, ethyl, n- and iso-propyl, n-, iso-, secondary- and tertiary-butyl, and the like, allyl, benzyl, cycloalkyl such as cyclopentyl and cyclohexyl, furfuryl, tetrahydrofurfuryl, lower alkyl substituted by lower alkoxy or lower alkyl thio, such as methoxyethyl, methoxyisopropyl, and methylthioethyl.

Preferably, R is lower alkyl and especially $C_{1-4}$ alkyl; R' and R'' are $C_{1-3}$ and especially $C_{1-2}$ alkyl or R' and R'' taken togehter with the adjacent carbon atom form a cyclopentyl group; and R''' is $C_{2-6}$ alkyl or cycloalkyl, especially cyclopentyl.

Preferred compounds include:
1.          N-Isopropyl-S-isopropyl-α-methyl-α-isopropylamino propyl-phosphonamidothioate.
4.          N-Cyclopentyl-S-methyl-α-cylopentylaminopropyl-α-methyl-propylphosphonamidothioate.
13.         N-Isopropyl-S-isopropyl-α-isopropylamino cyclopentyl-phosphonamidothioate.
12.         N-Isopropyl-S-sec.-butyl-α-methyl-α-isopropylamino propylphosphonamidothioate.

The types of starting amines usable in accordance with the process of the present invention are clearly characterized by the formula (III) stated above.

These starting compounds are well-known and can be prepared readily on an industrial scale.

As examples of such starting amines which can be used according to the present invention, there may be mentioned in particular: methylamine, ethylamine, isopropylamine, N-butylamine, sec.-butylamine, isobutylamine, tert.ibutylamine, furfurylamine, tetrahydrofurfuryl amine, cyclopentyl amine, 2-methoxyethylamine, 2-methoxy-1-methyl ethylamine, allylamine benzylamine, 2-methylthioethylamine, and the like.

The types of starting S-alkyl-α-chloro-α-alkyl (or aryl) alkylphosphonochloridothioates usable in accordance with the process of the present invention are clearly characterized by the formula (II) stated above.

These starting compounds are also known and can be prepared readily (cf. U.S. Pat. No. 3,346,669).

As examples of such starting S-alkyl-α-chloro-α-alkyl(or aryl) alkylphos-phonochloridothioates which can be used according to the present invention, there may be mentioned in particular:

S-Methyl-α-chloro-α-methyl propylphosphonochloridothioate
S-Ethyl-α-chloro-α-methyl propylphosphonochloridothioate
S-n-Propyl-α-chloro-α-methyl ethylphosphonochloridothioate
S-n-Propyl-α-chloro-α-methyl propylphosphonochloridothioate
S-Isopropyl-α-chloro-α-methyl propylphosphonochloridothioate
S-Isopropyl-α-chloro cyclopentylphosphonochloridothioate
S-sec.-butyl-α-chloro-α-methyl propylphosphonochloridothioate
S-Ethyl-α-chloro-α-phenyl ethylphosphonochloridothioate The production reaction is carried out preferably in the absence of a solvent. The amine reactants when used in excess act quite effectively as solvent. Solvents (this term also includes mere diluents) can be used advantageously when the starting materials are particularly reactive and moderation of the resulting exothermic reaction is desired or when the reacting amine is a gas. Preferred solvents (other than the starting amines themselves) are those which do not react with, or react only slightly with, S-alkyl-α-chloro-α-alkyl (or aryl) alkylphosphonochloridothioates or amines, i.e. inert organic solvents. Examples of such solvents include highly polar aprotic ones such as N,N,-dimethyl formamide, dimethyl sulfoxide, N-methylpyrrolidone; hydrocarbons such as hexane, benzene, toluene; ethers such as tetrahydrofuran, dibutylether, dioxane; esters such as ethyl acetate; and the like; and any desired mixtures of these solvents.

The reaction temperature used can be varied within a fairly wide range. In general, the reaction is carried out at substantially between about 25°–150° C. and preferably between about 60°–90°C.

In general, the starting reactants are used in proportions of approximately four molar equivalents of the amine to one molar equivalent of the S-alkyl-α-chloro-α-alkyl (or aryl) alkylphosphonochloridothioate. Optionally, two molar equivalents of the starting amine and two molar equivalents of a tertiary amine such as triethylamine, pyridine, and the like (as acid-binding agent) can be used advantageously instead of four molar equivalents of starting amine alone. The reaction can, for example, be carried out in such a manner that the starting S-alkyl-α-chloro-α-alkyl (or aryl) alkylphosphonochloridothioate is added dropwise to the starting amine, or a solution thereof, at 60°–90° C., and the reaction mixture stirred at this temperature until the reaction has gone to completion (usually 1–4 hours). Of course, the reverse order may also be used; i.e. with the addition of amine to the S-alkyl-α-chloro-α-alkyl (or aryl) alkylphosphonochloridothioate.

After completion of the reaciton, the reaction mixture is worked up in the usual manner, i.e. by extracting with water until the aqueous extracts are neutral, drying the organic phase with a suitable drying agent such as anhydrous sodium sulfate, and removing the solvent in vacuo at 50°–60° C. or by direct distillation. The resulting crude products can be further purified by vacuum distillation or recrystallization from a suitable solvent such as n-hexane, if desired.

Advantageously, the active compounds according to the present invention exhibit strong herbicidal properties as well as strong growth regulating properties, with low toxicity to warm-blooded creatures.

The substances according to the invention exhibit herbicidal properties and can therefore be used as weed killers. The term weeds in the widest sense comprises all plants which grow in places where they are undesirable.

Whether the substances according to the invention act as total or as selective herbicides, depends essentially upon the amount applied.

The substances according to the invention can be applied, for example, to the following plants: Dicotyledons, such as mustard (*Sinapis*), cress (*Lepidium*) cleavers (*Galium*), chickweed (*Stellaria*), camomile (*Matricaria*), French weed (Galinsoga), goose-foot (*Chenopodium*), stinging nettle (*Urtica*), groundsel (*Senecio*), cotton (*Gossypium*), beet (*Beta*), carrots (*Daucus*), beans (*Phaseolus*), potatoes (*Solanum*), coffee (*Coffea*); monocotyledons, such as cat's tail (*Phleum*), meadow grass (*Poa*), fescue grass (*Festuca*), Eleusine, bristle-grass (*Seteria*), ray-grass (*Lolium*), brome grass (*Bromus*), chicken millet (*Echinochloa*), wheat (*Triticum*), millet (*Panicum*), cane sugar (*Saccharum*), maize (*Zea*), rice (*Oryza*), oats (*Avena*), and barley (*Hordeum*).

The plant species indicated in this enumeration are representative examples of the genus given in Latin. However, the use of the substances according to the invention is in no way limited to these genera but applies to other plants in the same manner.

As to the growth-regulating properties, the compounds of the instant invention exhibit remarkable growth regulatory action when applied to plants, bulbs, seeds, and other forms of plant life.

Furthermore, the present invention contemplates methods of regulating the growth of plants, e.g.

for stunting or retarding the growth of monocotolydenous and dicotolydenous crop and weed plants, ornamental plants, shrubs and trees; and for retarding the growth of grasses such as Kentucky Blue Grass, fescue, and the like, by reducing both the clipping weight per unit area and the plant height, and thus providing a means of chemical mowing; and for inhibiting or partially inhibiting the undesirable growth of suckers on plants, for example, tobacco plants and the like.

The active compounds according to the instant invention can be utilized, if desired, in the form of the usual formulations or compositions with conventional inert pesticidal diluents, or extenders, i.e. conventinal pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for exmaple, in the case where water is used as diluent, organic solvents may be added as auxiliary solvents. The following may be chiefly considered for use as conventional carrier vehicles for this purpose: Inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.) paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as gorund natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates; etc.); whereas the following may be chiefly considered for use as conventional carrier vehicle assitants, e.g. surface-active agents, for this purpose: Emulsifying agents, such as non-ionic and/or anionic emulsifying agents (e.g. polyethylene oxide esters of fatty acids, polyethylene oxide ethers of fatty alcohols, alkyl sulfonates; aryl sulfonates, etc. and especially alkyl aryl-polyglycol ethers, magnesium stearate, sodium oleate, etc.); and/or dispersing agents, such as lignin, sulfite waste liquors, methyl cellulose, etc.

Such active compounds may be employed alone in the form of mixtures with one another and/or with such solid and/or liquid dispersible carrier vehicles and/or with other known compatible active agents, especially plant protection agents, such as other defoliants, desiccants or insecticides, or fungicides, bactericides, etc., if desired, or in the form of particular dosage preparations for specific application made therefrom such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.01–p54 20 percent, preferably 0.01–5.0 percent, by weight of the mixture. Thus, the present invention contemplates overall compositions which comprise mixtures of a dispersible carrier vehicle such as (1) a dispersible carrier solid, or (2) a dispersible carrier liquid preferably including a carrier vehicle assistant, e.g. surface-active agent, and an amount of the active compound which is effective for the purpose in question and which is generally between about 0.01–95 percent by weight of the mixture.

While the active compounds can be used according to the pre-emergence method, they are particularly effective when used according to the post-emergence method.

When the active compounds are used as total herbicides, the content of active compound in the composition mixture actually applied is, in general, substantially between about 0.1–20 percent, and preferably between about 0.2–5.0 percent, by weight of the mixture. On the other hand, when the active compounds are used as selective herbicides, the content of the active compound in the mixture is, in general, substantially between about 0.01–5.0 percent, and preferably between about 0.03–5.0 percent, by weight of the mixture. Thus, the present invention contemplates overall compositions which comprise mixtures of a conventional dispersible carrier vehicle such as (1) a dispersible inert finely divided carrier solid and/or (2) a dispersible carrier liquid such as an inert organic solvent and/or water preferably including a surface-active and/or water preferably including a surface-active effective amount of a carrier vehicle assistant, e.g. surface-active agent, such as an emulsifying agent and/or a dispersing agent, and an amount of the active compound which is effective for the purpose in question and which is generally between about 0.001–95 percent, or 0.2–95 percent, by weight of mixutre.

Generally, irrespective of any carrier vehicle which may be present, the active compounds may be applied in an amount substantially between about 0.1–10 lbs. per acre, for herbicidal purposes and substantially between about 0.01 to 10 lbs. per acre for growth regulating purposes.

The active compound can also be used in accordance with the well-known ultra-low volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 0.2–16 fluid ounces/acre, are sufficient. In this process it is possible to use highly concentrated liquid compositions with said liquid carrier vehicles containing from about 20 to about 95 percent by weight of the active compound, or even the 100 percent active substance alone, i.e. about 20–100 percent by weight of the active compound.

It will be realized, of course, that the concentration of the particular active compound utilized in admixture with the carrier vehicle will depend upon the intended appliction and may be varied within a fairly wide range, depending upon the weather conditions, the purpose for which the active compound is used, and the type locus to be treated. Therefore, in special cases, it is possible to go above or below the aforementioned concentration ranges and/or amount per unit area of the active compound.

The outstanding herbicidal and growth-regulating activity of the particular active compounds of the present invention is illustrated, without limitation, by the following exmaples.

EXAMPLE 1

Post-emergence test
Solvent: 10 parts by weight acetone

To produce a suitable preparation of the particular compound, 1 part by weight of such active compound is mixed with the stated amount of solvent and the resulting concentrate is diluted further with acetone to the desired final concentration.

Test plants which have a height of about 5–15 cm. are sprayed with the preparation of the given active compound until just dew moist. After 10 days, the degree of damage to the plants is determined and characterized by the values 0–10, which have the following meaning:

| 0 | no effect | 6 | 60% Kill |
| 1 | 10% Kill | 7 | 70% Kill |
| 2 | 20% Kill | 8 | 80% Kill |
| 3 | 30% Kill | 9 | 90% Kill |
| 4 | 40% Kill | 10 | Plants completely dead |
| 5 | 50% Kill | | |

The particular active compounds tested, the rates thereof applied, and the results obtained can be seen from the following Table 1:

TABLE 1.—POST-EMERGENCE TEST

| Active compound | Rate of active compound applied in lbs./acre | Pig weed | Wild mustard | Morning glory | Japanese millet | Water grass | Wild oats |
| --- | --- | --- | --- | --- | --- | --- | --- |
| (A) $Cl-C(C_2H_5)(CH_3)-P(O)(OCH_3)(SCH(CH_3)Cl)$ (Known.) | 8<br>2 | 9<br>3 | 7<br>1 | 6<br>3 | 6<br>1 | 5<br>1 | 1<br>0 |
| (B) 2-Cl-4-($C_2H_5$NH)-6-($i$-$C_3H_7$NH)-pyrimidine (Known.) | 8<br>2 | 10<br>9 | 9<br>9 | 10<br>9 | 9<br>9 | 9<br>9 | 9<br>9 |
| (1) $i$-$C_3H_7$NH—C($CH_3$)($C_2H_5$)—P(O)(S$C_3H_7$-$i$)(NH—$C_3H_7$-$i$) | 8<br>2 | 10<br>9 | 10<br>10 | 10<br>9 | 10<br>8 | 10<br>8 | 9<br>6 |
| (2) $i$-$C_3H_7$NH—C($CH_3$)($C_2H_5$)—P(O)(S$C_3H_7$-$n$)(NH—$C_3H_7$-$i$) | 8<br>2 | 10<br>10 | 10<br>9 | 10<br>10 | 9<br>6 | 9<br>6 | 6<br>5 |
| (3) $i$-$C_3H_7$NH—C($CH_3$)($CH_3$)—P(O)(S$C_3H_7$-$n$)(NH—$C_3H_7$-$i$) | 8<br>2 | 10<br>9 | 7<br>6 | 10<br>8 | 8<br>5 | 9<br>4 | 8<br>4 |
| (4) cyclopentyl-NH—C($CH_3$)($C_2H_5$)—P(O)(SCH$_3$)(NH-cyclopentyl) | 8<br>2 | 10<br>10 | 10<br>10 | 10<br>7 | 10<br>9 | 10<br>9 | 9<br>6 |
| (5) $n$-$C_4H_9$NH—C($CH_3$)($C_2H_5$)—P(O)(S$C_3H_7$-$i$)(NH $C_4H_9$-$n$) | 8<br>2 | 10<br>10 | 10<br>10 | 10<br>10 | 8<br>5 | 7<br>5 | 5<br>5 |
| (6) $n$-$C_6H_{13}$NH—C($CH_3$)($C_2H_5$)—P(O)(S$C_3H_7$-$i$)(NH $C_6H_{13}$-$n$) | 8<br>2 | 10<br>10 | 9<br>8 | 9<br>8 | 7<br>6 | 7<br>6 | 7<br>6 |
| (7) $i$-$C_4H_9$NH—C($CH_3$)($C_2H_5$)—P(O)(S$C_3H_7$-$i$)(NH $C_4H_9$-$i$) | 8<br>2 | 10<br>10 | 10<br>10 | 10<br>10 | 10<br>9 | 10<br>9 | 9<br>6 |
| (8) phenyl-CH-NH—C($CH_3$)($C_2H_5$)—P(O)(S$C_3H_7$-$i$)(NH-CH-phenyl) | 9<br>2 | 9<br>9 | 10<br>10 | 10<br>9 | 6<br>6 | 6<br>5 | 5<br>6 |

TABLE 1.—POST-EMERGENCE TEST—Continued

| Active compound | Rate of active compound applied in lbs./acre | Pig weed | Wild mustard | Morning glory | Japanese millet | Water grass | Wild oats |
|---|---|---|---|---|---|---|---|
| (9) n-C$_5$H$_{11}$—CH(CH$_3$)—NH—C(CH$_3$)(C$_2$H$_5$)—P(=O)(SCH$_3$)—NH—CH(CH$_3$)—C$_5$H$_{11}$-n | 8 / 2 | 9 / 9 | 10 / 10 | 10 / 10 | 9 / 7 | 9 / 6 | 7 / 6 |
| (10) C$_2$H$_5$—NH—C(CH$_3$)(C$_2$H$_5$)—P(=O)(SC$_3$H$_7$-i)—NH—C$_2$H$_5$ | 8 / 2 | 10 / 10 | 9 / 7 | 10 / 10 | 9 / 6 | 9 / 6 | 7 / 5 |
| (11) n-C$_3$H$_7$—NH—C(CH$_3$)(C$_2$H$_5$)—P(=O)(SC$_3$H$_7$-i)—NH—C$_3$H$_7$-n | 8 / 2 | 10 / 10 | 10 / 10 | 10 / 10 | 9 / 5 | 9 / 5 | 5 / 4 |
| (12) i-C$_3$H$_7$NH—C(CH$_3$)(C$_2$H$_5$)—P(=O)(SC$_4$H$_9$-sec)—NH—C$_3$H$_7$-i | 8 / 2 | 10 / 10 | 10 / 9 | 10 / 9 | 10 / 5 | 10 / 6 | 8 / 4 |
| (13) i-C$_3$H$_7$—NH—C(cyclopentyl)—P(=O)(SC$_3$H$_7$-i)—NH—C$_3$H$_7$-i | 8 / 2 | 10 / 10 | 10 / 9 | 9 / 9 | 9 / 7 | 9 / 6 | 7 / 4 |
| (14) i-C$_4$H$_9$—NH—C(CH$_3$)(C$_2$H$_5$)—P(=O)(SC$_4$H$_9$-sec)—NHC$_4$H$_9$-i | 8 / 2 | 10 / 10 | 10 / 9 | 10 / 9 | 10 / 7 | 10 / 6 | 8 / 6 |
| (15) cyclopentyl-NH—C(CH$_3$)(C$_2$H$_5$)—P(=O)(SC$_3$H$_7$-i)—NH-cyclopentyl | 8 / 2 | 10 / 10 | 10 / 10 | 10 / 10 | 9 / 6 | 9 / 6 | 7 / 5 |

EXAMPLE 2

Pre-emergence test
Solvent: 10 parts by weight acetone

To produce a suitable preparation of the particular active compound, 1 part by weight of such active compound is mixed with the stated amount of solvent, and the resulting concentrate is then diluted further with acetone to the desired final concentration.

Seeds of the test plants are sown in normal soil and, after 24 hours, the soil surface sprayed with the preparation of the given active compound. The soil is then watered in a normal manner to effect normal germination and growth. After one week, the degree of damage to the test plants is determined and characterized by the values 0–10, which have the following meaning:

| | | | |
|---|---|---|---|
| 0 | No effect | 6 | 60% Kill or damage |
| 1 | 10% Kill or damage | 7 | 70% Kill or damage |
| 2 | 20% Kill or damage | 8 | 80% Kill or damage |
| 3 | 30% Kill or damage | 9 | 90% Kill or damage |
| 4 | 40% Kill or damage | 10 | Plants completely dead or not emerged |
| 5 | 50% Kill or damage | | |

The particular active compounds tested, the rates thereof applied and the results obtained can be seen from the following Table 2:

TABLE 2.—PRE-EMERGENCE TEST

| Active compound | Rates of active compound applied in lbs./acre | Pig weed | Wild mustard | Morning glory | Japanese millet | Water grass | Wild oats |
|---|---|---|---|---|---|---|---|
| (A) Cl—C(CH$_3$)(C$_2$H$_5$)—P(=O)(SCH$_3$)—N(CH$_3$)$_2$ with Cl (Known.) | 15 / 5 | 3 / 2 | 6 / 2 | 1 / 1 | 1 / 0 | 3 / 0 | 2 / 0 |
| (B) C$_2$H$_5$—NH—(2-Cl-pyrimidin-4,6-diyl)—NH—CH(CH$_3$)$_2$ (Known.) | 15 / 5 | 9 / 9 | 10 / 9 | 10 / 9 | 10 / 10 | 9 / 9 | 8 / 7 |

TABLE 2.—PRE-EMERGENCE TEST—Continued

| Active compound | | Rates of active compound applied in lbs./acre | Pig weed | Wild mustard | Morning glory | Japanese millet | Water grass | Wild oats |
|---|---|---|---|---|---|---|---|---|
| (1) | $i\text{-}C_3H_7NH-\underset{\underset{C_2H_5}{\|}}{\overset{\overset{CH_3}{\|}}{C}}-\underset{NH-C_3H_7\text{-}i}{\overset{\overset{O}{\|}}{P}}-SC_3H_7\text{-}i$ | 15<br>5 | 10<br>10 | 10<br>10 | 10<br>10 | 10<br>10 | 10<br>10 | 9<br>7 |
| (2) | $i\text{-}C_3H_7NH-\underset{\underset{C_2H_5}{\|}}{\overset{\overset{CH_3}{\|}}{C}}-\underset{NH-C_3H_7\text{-}i}{\overset{\overset{O}{\|}}{P}}-SC_3H_7\text{-}n$ | 15<br>5 | 9<br>9 | 9<br>9 | 10<br>10 | 10<br>10 | 10<br>9 | 8<br>8 |
| (3) | $i\text{-}C_3H_7NH-\underset{\underset{CH_3}{\|}}{\overset{\overset{CH_3}{\|}}{C}}-\underset{NH-C_3H_7\text{-}i}{\overset{\overset{O}{\|}}{P}}-SC_3H_7\text{-}n$ | 15<br>5 | 9<br>6 | 10<br>7 | 9<br>7 | 9<br>7 | 9<br>7 | 10<br>6 |
| (4) | cyclopentyl-NH-$\underset{\underset{C_2H_5}{\|}}{\overset{\overset{CH_3}{\|}}{C}}$-$\underset{NH\text{-}cyclopentyl}{\overset{\overset{O}{\|}}{P}}$-SCH_3 | 15<br>5 | 10<br>9 | 10<br>9 | 10<br>9 | 9<br>8 | 9<br>8 | 7<br>4 |
| (5) | $n\text{-}C_4H_9-NH-\underset{\underset{C_2H_5}{\|}}{\overset{\overset{CH_3}{\|}}{C}}-\underset{NH-C_4H_9\text{-}n}{\overset{\overset{O}{\|}}{P}}-SC_3H_7\text{-}i$ | 15<br>5 | 9<br>9 | 10<br>9 | 10<br>8 | 8<br>7 | 9<br>7 | 7<br>3 |
| (6) | $n\text{-}C_6H_{13}-NH-\underset{\underset{C_2H_5}{\|}}{\overset{\overset{CH_3}{\|}}{C}}-\underset{NH-C_6H_{13}\text{-}n}{\overset{\overset{O}{\|}}{P}}-SC_3H_7\text{-}i$ | 15<br>5 | 9<br>6 | 9<br>8 | 7<br>6 | 5<br>2 | 5<br>2 | 1<br>0 |
| (7) | $i\text{-}C_4H_9NH-\underset{\underset{C_2H_5}{\|}}{\overset{\overset{CH_3}{\|}}{C}}-\underset{NH-C_4H_9\text{-}i}{\overset{\overset{O}{\|}}{P}}-SC_3H_7\text{-}i$ | 15<br>5 | 9<br>3 | 10<br>3 | 10<br>1 | 9<br>1 | 9<br>1 | 6<br>1 |
| (8) | Ph-CH_2NH-$\underset{\underset{C_2H_5}{\|}}{\overset{\overset{CH_3}{\|}}{C}}$-$\underset{NH-CH_2-Ph}{\overset{\overset{O}{\|}}{P}}$-SC_3H_7-i | 15<br>5 | 9<br>5 | 10<br>7 | 8<br>6 | 5<br>4 | 4<br>4 | 5<br>0 |
| (9) | $C_2H_5NH-\underset{\underset{C_2H_5}{\|}}{\overset{\overset{CH_3}{\|}}{C}}-\underset{NH-C_2H_5}{\overset{\overset{O}{\|}}{P}}-SC_3H_7\text{-}i$ | 15<br>5 | 9<br>8 | 8<br>4 | 9<br>7 | 9<br>7 | 9<br>6 | 6<br>2 |
| (10) | $n\text{-}C_3H_7NH-\underset{\underset{C_2H_5}{\|}}{\overset{\overset{CH_3}{\|}}{C}}-\underset{NH-C_3H_7\text{-}n}{\overset{\overset{O}{\|}}{P}}-SC_3H_7\text{-}i$ | 15<br>5 | 10<br>10 | 9<br>8 | 9<br>9 | 10<br>9 | 9<br>9 | 5<br>3 |
| (11) | $i\text{-}C_3H_7NH-\underset{\underset{C_2H_5}{\|}}{\overset{\overset{CH_3}{\|}}{C}}-\underset{NH-C_3H_7\text{-}i}{\overset{\overset{O}{\|}}{P}}-SC_4H_9\text{-}sec.$ | 15<br>5 | 10<br>9 | 9<br>7 | 10<br>10 | 10<br>9 | 10<br>9 | 5<br>4 |
| (12) | cyclopentyl with $i\text{-}C_3H_7$NH and P(SC_3H_7-i)(NH-C_3H_7-i) | 15<br>5 | 10<br>9 | 10<br>9 | 10<br>10 | 10<br>10 | 10<br>10 | 7<br>6 |
| (13) | $i\text{-}C_4H_9NH-\underset{\underset{C_2H_5}{\|}}{\overset{\overset{CH_3}{\|}}{C}}-\underset{NH-C_4H_9\text{-}i}{\overset{\overset{O}{\|}}{P}}-SC_4H_9\text{-}sec.$ | 15<br>5 | 10<br>10 | 10<br>9 | 9<br>8 | 8<br>7 | 8<br>6 | 5<br>5 |
| (14) | cyclopentyl-NH-$\underset{\underset{C_2H_5}{\|}}{\overset{\overset{CH_3}{\|}}{C}}$-$\underset{NH\text{-}cyclopentyl}{\overset{\overset{O}{\|}}{P}}$-SC_3H_7-i | 15<br>5 | 10<br>10 | 10<br>10 | 10<br>8 | 10<br>10 | 10<br>10 | 8<br>8 |

EXAMPLE 3

Cucumber Root Test

Wettable powder base consisting of:
 92 parts by weight hydrated silica (ultra fine, "Hi-Sil 233")
 4 parts by weight sodium lignin sulfonate ("Marasperse N")
 4 parts by weight polycondensate of ethylene oxide, propylene oxide and propylene glycol, Mol. wt. about 1000, ("Pluronic L-61")

To produce a suitable preparation of the particular active compound 1 part by weight of such active compound is mixed intimately with 1 part by weight of the stated wettable powder base, and the resulting mixutre is diluted with distilled water to the desired final concentration.

Two 15.0 × 2.5 cm. petri dishes fitted with a 15.0 cm. Whatman No. 1 filter paper are used for each test rate. Ten cucumber seeds are added to each petri dish. Seven (7) ml. of the test solution of the desired concentration are added to each petri dish. Six petri dishes are prepared in the same manner but treated with distilled water to serve as controls. The thus prepared dishes are incubated in darkness at 22° C. for four days.

Measurements in centimeters of the radicle of each seedling are recorded on the third and fourth days of incubation. A rating is made on the basis of growth response during the twenty-four (24) hour period between the third and fourth day. A 0–9 scale is used to indicate the growth regulating activity of each test chemical. A "0" scale reading indicates little or no growth response, i.e. the radicle lengths average within 0 to 10 percent of the radicle lengths of the controls. A "9" reading corresponds to a 90 percent or better growth response. A growth promotion is indicated by the appropriate scale reading in parenthesis ( ). A growth retardation is indicated by a scale reading standing alone.

The particular active compounds tested, the amounts thereof applied, and the results obtained can be seen from the following Table 3:

EXAMPLE 4

Snapbean Foliar Spray Test
Wettable powder base consisting of:
  92 parts by weight hydrated silica (ultra fine, "Hi-Sil 233")
  4 parts by weight sodium lignin sulfonate ("Marasperse N")
  4 parts by weight polycondensate of ethylene oxide, propylene oxide and propylene glycol, mol. wt. about 1000, ("Pluronic L–61")

To produce a suitable preparation of the particular active compounds, 1 part by weight of such active compound is mixed intimately with 1 part by weight of the stated wettable powder base and the resulting mixture is diluted with distilled water to the desired final concentration.

Snap bean plants, as soon as the primary leaves are relatively smooth (6–7 days old) and are capable of absorbing and translocating chemicals, are sprayed with the given compound until just dew moist. For each test, 40 ml. of the appropriate dilution are sprayed on four plants in an area of five square feet.

Treated plants are moved to a greenhouse and are left for 10 to 14 days. The degree of growth response is determined by measuring total plant height, length of second node to apex, and petiole length of first trifoliate leaves.

A 0–9 scale reading is used to express the degree of growth response from the test chemicals. A "0" scale reading includes the growth retardation within the

TABLE 3.—CUCUMBER ROOT TEST

| | Active compound | Test concentration, p.p.m. | | |
|---|---|---|---|---|
| | | 10,000 | 1,000 | 100 |
| (C) | $CH_2-NH-N(CH_3)_2$ <br> $\|$ <br> $CH_2-COOH$ <br> (Known.) | 9 | 8 | 3 |
| (1) | $i\text{-}C_3H_7NH-\underset{\underset{C_2H_5}{\|}}{\overset{\overset{CH_3}{\|}}{C}}-\underset{NH-C_3H_7\text{-}i}{\overset{\overset{O}{\|}}{P}}\overset{SC_3H_7\text{-}i}{\diagup}$ | 9 | 9 | 2 |
| (2) | $i\text{-}C_3H_7NH-\underset{\underset{C_2H_5}{\|}}{\overset{\overset{CH_3}{\|}}{C}}-\underset{NH-C_3H_7\text{-}i}{\overset{\overset{O}{\|}}{P}}\overset{SC_3H_7\text{-}n}{\diagup}$ | 9 | 9 | 2 |
| (3) | $i\text{-}C_3H_7NH-\underset{\underset{CH_3}{\|}}{\overset{\overset{CH_3}{\|}}{C}}-\underset{NH-C_3H_7\text{-}i}{\overset{\overset{O}{\|}}{P}}\overset{SC_3H_7\text{-}n}{\diagup}$ | 9 | 9 | 1 |
| (4) | $\square\!\!>\!\!-NH-\underset{\underset{C_2H_5}{\|}}{\overset{\overset{CH_3}{\|}}{C}}-\underset{NH-\!<\!\!\square}{\overset{\overset{O}{\|}}{P}}\overset{SCH_3}{\diagup}$ | 9 | 9 | 5 |
| (7) | $i\text{-}C_4H_9NH-\underset{\underset{C_2H_5}{\|}}{\overset{\overset{CH_3}{\|}}{C}}-\underset{NH-C_4H_9\text{-}i}{\overset{\overset{O}{\|}}{P}}\overset{SC_3H_7\text{-}i}{\diagup}$ | 9 | 9 | 5 |
| (16) | $CH_3OCH_2CH_2NH-\underset{\underset{CH_3}{\|}}{\overset{\overset{CH_3}{\|}}{C}}-\underset{NH-CH_2CH_2OCH_3}{\overset{\overset{O}{\|}}{P}}\overset{SC_3H_7\text{-}n}{\diagup}$ | 9 | 1 | (3) | range of 0 to 10 percent as compared with the controls. A "9" scale reading corresponds to a 90 percent or more growth response.

The particular active compounds tested, the amounts thereof applied and the results obtained can be seen from the following Table 4:

TABLE 4.—SNAPBEAN FOLIAR SPRAY TEST

| Active compound | Concentration, p.p.m. | Plant height | Length of second node to apex | Petiole length of first trifoliate leaf |
|---|---|---|---|---|
| (D) $\langle\bigcirc\rangle-CH_2P^+(C_4H_9\text{-}n)_3, Cl^-$ (Known.) | 10,000<br>1,000<br>100 | 3<br>3<br>1 | 8<br>6<br>2 | 9<br>8<br>0 |
| (2) $i\text{-}C_3H_7NH-\underset{\underset{C_2H_5}{\mid}}{\overset{\overset{CH_3}{\mid}}{C}}-\overset{O}{\underset{\mid}{P}}\overset{S\,C_3H_7\text{-}n}{\underset{NH-C_3H_7\text{-}i}{}}$ | 10,000<br>1,000<br>100 | 3<br>2<br>0 | 8<br>5<br>0 | 7<br>2<br>0 |
| (4) cyclopentyl-$NH-\underset{\underset{C_2H_5}{\mid}}{\overset{\overset{CH_3}{\mid}}{C}}-\overset{O}{\underset{\mid}{P}}\overset{SCH_3}{\underset{NH\text{-cyclopentyl}}{}}$ | 10,000<br>1,000<br>100 | ——<br>6<br>3 | ——<br>8<br>5 | ——<br>7<br>1 |

The following further examples are set forth to illustrate, without limitation, the process for producing the active compounds according to the present invention.

EXAMPLE 5

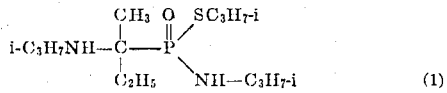

$$i\text{-}C_3H_7NH-\underset{\underset{C_2H_5}{\mid}}{\overset{\overset{CH_3}{\mid}}{C}}-\overset{O}{\underset{}{P}}\overset{SC_3H_7\text{-}i}{\underset{NH-C_3H_7\text{-}i}{}} \quad (1)$$

Two hundred grams (0.8 mole) of S-isopropyl-α-chloro-α-methyl propylphosphonochloridothioate are added dropwise over a 1 hour period to 192 g. (3.24 moles) of isopropylamine. Mechanical stirring is maintained throughout the addition. The temperature gradually rises from ca. 20° C. to 70° C. over a 2-hour period. The initially clear solution gradually becomes thicker during the reaction and then suddenly the reaction mixture turns to a crystalline mass. The reaction mass is allowed to cool to ambient temperature and then dissolved in 500 ml. of benzene. The benzene solution is extracted with water to remove isopropyl amine hydrochloride and then with 5% HCl to remove excess isopropylamine. It is finally extracted with 5 percent sodium bicarbonate solution and the benzene extract dried over anhydrous sodium sulfate. Solvent is then removed by in vacuo distillation to give 200 g. of colorless, white, crystals. The crystals were recrystallized from n-hexane to give 167 g. (71 percent) of purified material.

M.P. 83°–85° C.

Calculated for $C_{13}H_{31}N_2OPS$: C=53.0%; H=10.7%, N=9.5%; P=10.5%; S=10.9%

Found: C=52.7%; H=10.6%; N=9.6%; P=10.2%; S=11.1%.

The following compounds are prepared in an analogous manner as shown in Table 5:

TABLE 5

| | Compound | M.P., °C. | B.P./mm. Hg | $n_D^t$ |
|---|---|---|---|---|
| (2) | $i\text{-}C_3H_7-NH-\underset{\underset{C_2H_5}{\mid}}{\overset{\overset{CH_3}{\mid}}{C}}-\overset{O}{\underset{}{P}}\overset{S\,C_3H_7\text{-}n}{\underset{NH-C_3H_7\text{-}i}{}}$ | 76–9 | | |
| (3) | $i\text{-}C_3H_7NH-\underset{\underset{CH_3}{\mid}}{\overset{\overset{CH_3}{\mid}}{C}}-\overset{O}{\underset{}{P}}\overset{SC_3H_7\text{-}n}{\underset{NH-C_3H_7\text{-}i}{}}$ | 67–8 | | |
| (4) | cyclopentyl-$NH-\underset{\underset{C_2H_5}{\mid}}{\overset{\overset{CH_3}{\mid}}{C}}-\overset{O}{\underset{}{P}}\overset{SCH_3}{\underset{NH\text{-cyclopentyl}}{}}$ | 139–41 | | |
| (5) | $n\text{-}C_4H_9NH-\underset{\underset{C_2H_5}{\mid}}{\overset{\overset{CH_3}{\mid}}{C}}-\overset{O}{\underset{}{P}}\overset{S\,C_3H_7\text{-}i}{\underset{NH-C_4H_9\text{-}n}{}}$ | | 148–50° C./0.04 | 1.4880²² |
| (6) | $n\text{-}C_6H_{13}NH-\underset{\underset{C_2H_5}{\mid}}{\overset{\overset{CH_3}{\mid}}{C}}-\overset{O}{\underset{}{P}}\overset{S\,C_3H_7\text{-}i}{\underset{NH-C_6H_{13}\text{-}n}{}}$ | | 175–6° C./0.02 | 1.4856²⁰ |

TABLE 5 - Continued

| | | M.P., °C. | B.P./mm. Hg | $n_D^t$ |
|---|---|---|---|---|
| (7) | i-C₄H₉NH−C(CH₃)(C₂H₅)−P(=O)(SC₃H₇-i)(NH−C₄H₉-i) | | 135-7° C./0.01 | 1.4874²² |
| (8) | C₆H₅−CH₂NH−C(CH₃)(C₂H₅)−P(=O)(SC₃H₇-i)(NHCH₂−C₆H₅) | 90-2 | | |
| (9) | n-C₅H₁₁−CH(CH₃)−NH−C(CH₃)(C₂H₅)−P(=O)(SCH₃)(NH−CH(CH₃)−C₅H₁₁-n) | | 153-4° C./0.01 | 1.4872²⁴ |
| (10) | C₂H₅NH−C(CH₃)(C₂H₅)−P(=O)(SC₃H₇-i)(NH−C₂H₅) | | 128-30° C./0.01 | 1.4938²⁵ |
| (11) | n-C₃H₇NH−C(CH₃)(C₂H₅)−P(=O)(SC₃H₇-i)(NH−C₃H₇-n) | | 137-40° C./0.04 | 1.4886²⁶ |
| (12) | i-C₃H₇NH−C(CH₃)(C₂H₅)−P(=O)(SC₄H₉-sec.)(NH−C₃H₇-i) | 75-7 | | |
| (13) | cyclopentyl(i-C₃H₇NH)−P(=O)(SC₃H₇-i)(NH−C₃H₇-i) | 113-5 | | |
| (14) | i-C₄H₉NH−C(CH₃)(C₂H₅)−P(=O)(SC₄H₉-sec.)(NH−C₄H₉-i) | | 145° C./0.15 | 1.4877²⁵ |
| (15) | cyclopentyl-NH−C(CH₃)(C₂H₅)−P(=O)(SC₃H₇-i)(NH-cyclopentyl) | 100-3 | | |
| (16) | CH₃OCH₂CH₂NH−C(CH₃)(CH₃)−P(=O)(SC₃H₇-n)(NHCH₂CH₂OCH₃) | | 152° C./0.05 | 1.4930²⁰ |
| (17) | CH₂=CH−CH₂−NH−C(CH₃)(C₂H₅)−P(=O)(SCH₃)(NH−CH₂−CH=CH₂) | Dec. | | 1.5173²⁵ |
| (18) | CH₃OCH₂CH(CH₃)−NH−C(CH₃)(C₂H₅)−P(=O)(SCH₃)(NH−CH(CH₃)CH₂OCH₃) | | 133° C./0.01 | 1.4928²⁵ |
| (19) | i-C₃H₇NH−C(CH₃)(C₂H₅)−P(=O)(SC₂H₅)(NH−C₃H₇-i) | 79-81 | | |
| (20) | furfuryl-CH₂NH−C(CH₃)(C₂H₅)−P(=O)(SCH₃)(NH−CH₂-furfuryl) | | 185-90° C./0.01 | 1.5471²³ |
| (21) | tetrahydrofurfuryl-CH₂NH−C(CH₃)(C₂H₅)−P(=O)(SCH₃)(NH−CH₂-tetrahydrofurfuryl) | Dec. | | 1.5185²³ |

TABLE 5—Continued

| | M.P., °C. | B.P./mm. Hg | $n_D^t$ |
|---|---|---|---|
| (22) [structure] | 84-8 | | |
| (23) [structure] | 132 | | |
| (24) [structure] | 102 | | |
| (25) [structure] | | | |
| (26) [structure] | | 135° C./0.12 | $1.6714^{20}$ |
| (27) [structure] | | 102° C./0.1 | $1.5240^{25}$ |
| (28) [structure] | 51 | 143° C./0.08 | |
| (29) [structure] | 95-97 | | |
| (30) [structure] | | 205° C./0.07 | $1.5450^{25}$ |
| (31) [structure] | 116-117 | | |

It will be appreciated that the instant specification and examples are set forth by way of illustration and not limitation, and that various modifications and changes may be made without departing from the spirit and scope of the present invention.

What is claimed is:

1. Phosphonamidothioates of the formula

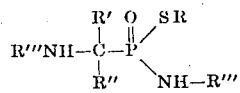

in which

R is alkyl of one to seven carbon atoms or cyclohexyl,

R' and R'' each individually is alkyl of one to six carbon atoms, phenyl, 2-thienyl, p-tolyl or R' and R'' taken together with the adjacent carbon atom form a cyclopentyl group, and each R''' is the same or a different alkyl or alkenyl of one to seven carbon atoms, arylalkyl, cycloalkyl having five or six ring carbon atoms, alkylthioalkyl or alkoxyalkyl.

2. Compound according to claim 1 wherein R is lower alkyl, R' and R'' are alkyl of one to three carbon atoms or, togehter with the adjacent carbon atom, a cyclopentyl group, and each R''' is lower alkyl or alkenyl, benzyl, cycloalkyl having five or six ring carbon atoms, or lower alkoxy lower alkyl.

3. Compound according to claim 1 wherein R is alkyl of one to four carbon atoms, R' and R'' are methyl or ethyl or, together with the adjacent carbon atom, a cylopentyl group, and both R''' radicals are the same alkyl of two to six carbon atoms or cyclopentyl.

4. Compound according to claim 1 wherein such compound is

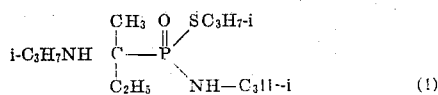 (1)

5. Compound according to claim 1 wherein such compound is

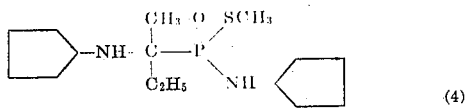 (4)

6. Compound according to claim 1 wherein such compound is

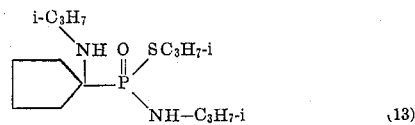 (13)

7. Compound according to claim 1 wherein such compound is

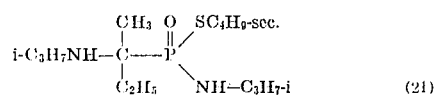 (21)

* * * * *